United States Patent
Takebayashi et al.

(10) Patent No.: US 12,195,015 B2
(45) Date of Patent: Jan. 14, 2025

(54) DRIVER ASSISTANCE APPARATUS AND RECORDING MEDIUM CONTAINING COMPUTER PROGRAM

(71) Applicant: SUBARU CORPORATION, Tokyo (JP)

(72) Inventors: Yosuke Takebayashi, Tokyo (JP); Takeshi Yoneda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/925,962

(22) PCT Filed: Sep. 27, 2021

(86) PCT No.: PCT/JP2021/035443
§ 371 (c)(1),
(2) Date: Nov. 17, 2022

(87) PCT Pub. No.: WO2023/047598
PCT Pub. Date: Mar. 30, 2023

(65) Prior Publication Data
US 2024/0227820 A1    Jul. 11, 2024

(51) Int. Cl.
*B60W 50/00*    (2006.01)
*B60W 30/16*    (2020.01)

(52) U.S. Cl.
CPC ...... *B60W 50/0097* (2013.01); *B60W 30/162* (2013.01); *B60W 2420/00* (2013.01);
(Continued)

(58) Field of Classification Search
CPC ........... B60W 50/0097; B60W 30/162; B60W 2420/00; B60W 2554/4042; B60W 2554/4044; B60W 2754/50
See application file for complete search history.

(56) References Cited

U.S. PATENT DOCUMENTS

| 3,434,214 | A  | * | 3/1969 | Pratt | 33/264 |
| 9,082,283 | B2 | * | 7/2015 | Sasaki | G08B 21/02 340/576 |

(Continued)

FOREIGN PATENT DOCUMENTS

| JP | 2005178622 | A | * | 7/2005 | B60R 16/02 |
| JP | 2008287480 | A | * | 11/2008 | B60R 21/00 |

(Continued)

OTHER PUBLICATIONS

Z. Cui, X. Xia and X. Pei, "A Modified Vehicle Following Control System on the Curved Road Based on Model Predictive Control," 2021 33rd Chinese Control and Decision Conference (CCDC), Kunming, China, 2021, pp. 1098-1103, doi: 10.1109/CCDC52312. 2021.9602682. (Year: 2021).*

(Continued)

*Primary Examiner* — Elaine Gort
*Assistant Examiner* — Brittany Renee Peko
(74) *Attorney, Agent, or Firm* — Rimon P.C.

(57) ABSTRACT

A driver assistance apparatus for a vehicle calculates a vehicle speed of a random vehicle present ahead of the vehicle, and momentum of a front part or a rear part of the random vehicle, on the basis of detection data by a surrounding environment sensor configured to detect data regarding surrounding environment around the vehicle, and estimate a slip angle or a slip angular speed of a rear wheel of the random vehicle, on the basis of data regarding at least the vehicle speed of the random vehicle and the momentum of the front part or the rear part of the random vehicle, and data regarding an estimated distance from the rear wheel of the random vehicle to the front part or the rear part of the random vehicle.

6 Claims, 8 Drawing Sheets

(52) U.S. Cl.
 CPC ............... *B60W 2554/4042* (2020.02); *B60W 2554/4044* (2020.02); *B60W 2754/50* (2020.02)

(56) References Cited

U.S. PATENT DOCUMENTS

| | | | |
|---|---|---|---|
| 10,066,961 B2* | 9/2018 | Korzunov | G01C 21/3697 |
| 2017/0316691 A1* | 11/2017 | Miller | G08G 1/162 |
| 2019/0152478 A1* | 5/2019 | Kotteri | B60W 40/076 |
| 2021/0046912 A1* | 2/2021 | Miller | B60T 8/17616 |

FOREIGN PATENT DOCUMENTS

| | | |
|---|---|---|
| JP | 2015-000655 A | 1/2015 |
| JP | 2018-097644 A | 6/2018 |

OTHER PUBLICATIONS

International Search Report in the corresponding International Application No. PCT/JP2021/035443 dated Dec. 14, 2021, with English Translation (4 pages).

* cited by examiner

[ FIG. 1 ]
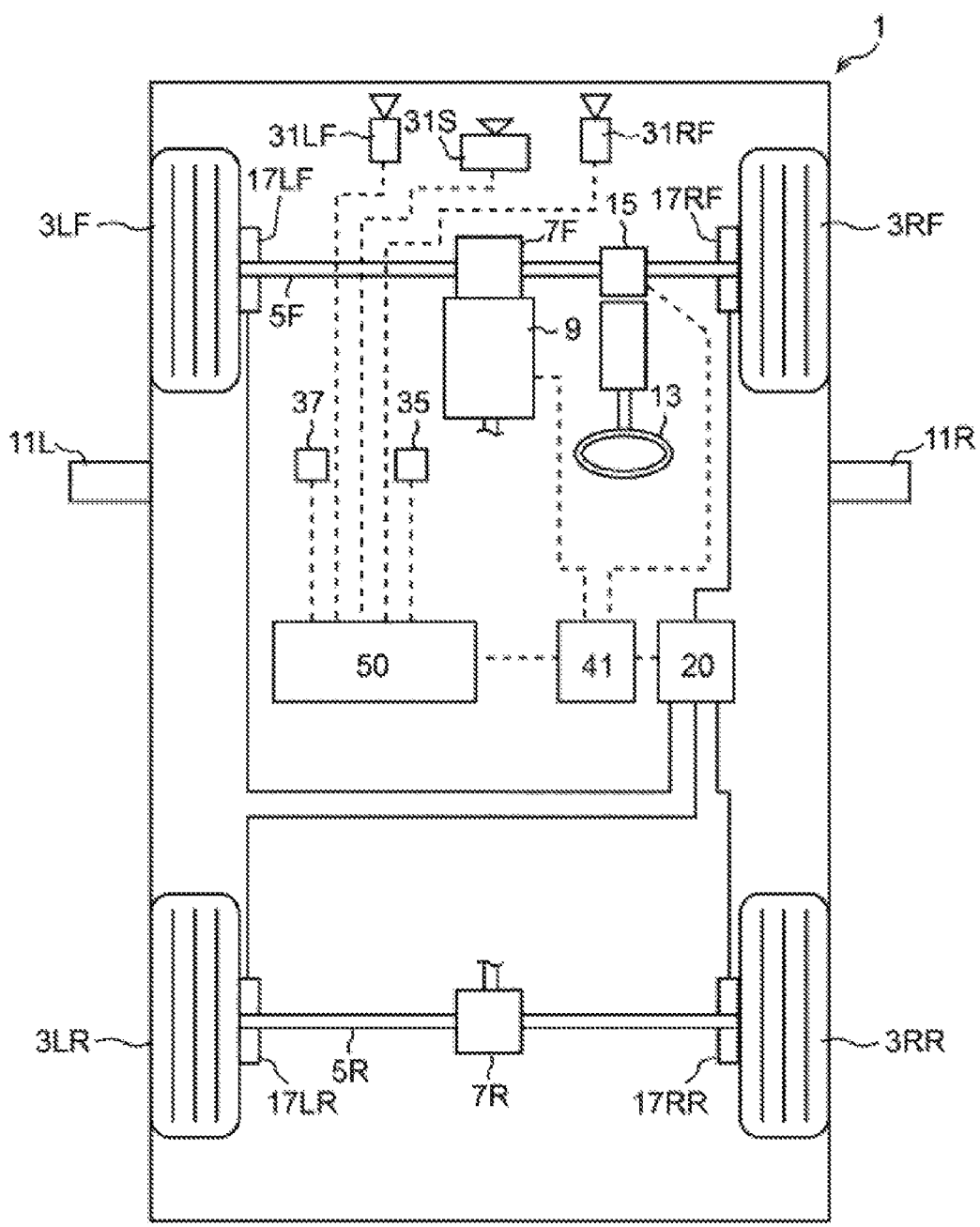

[FIG. 2]
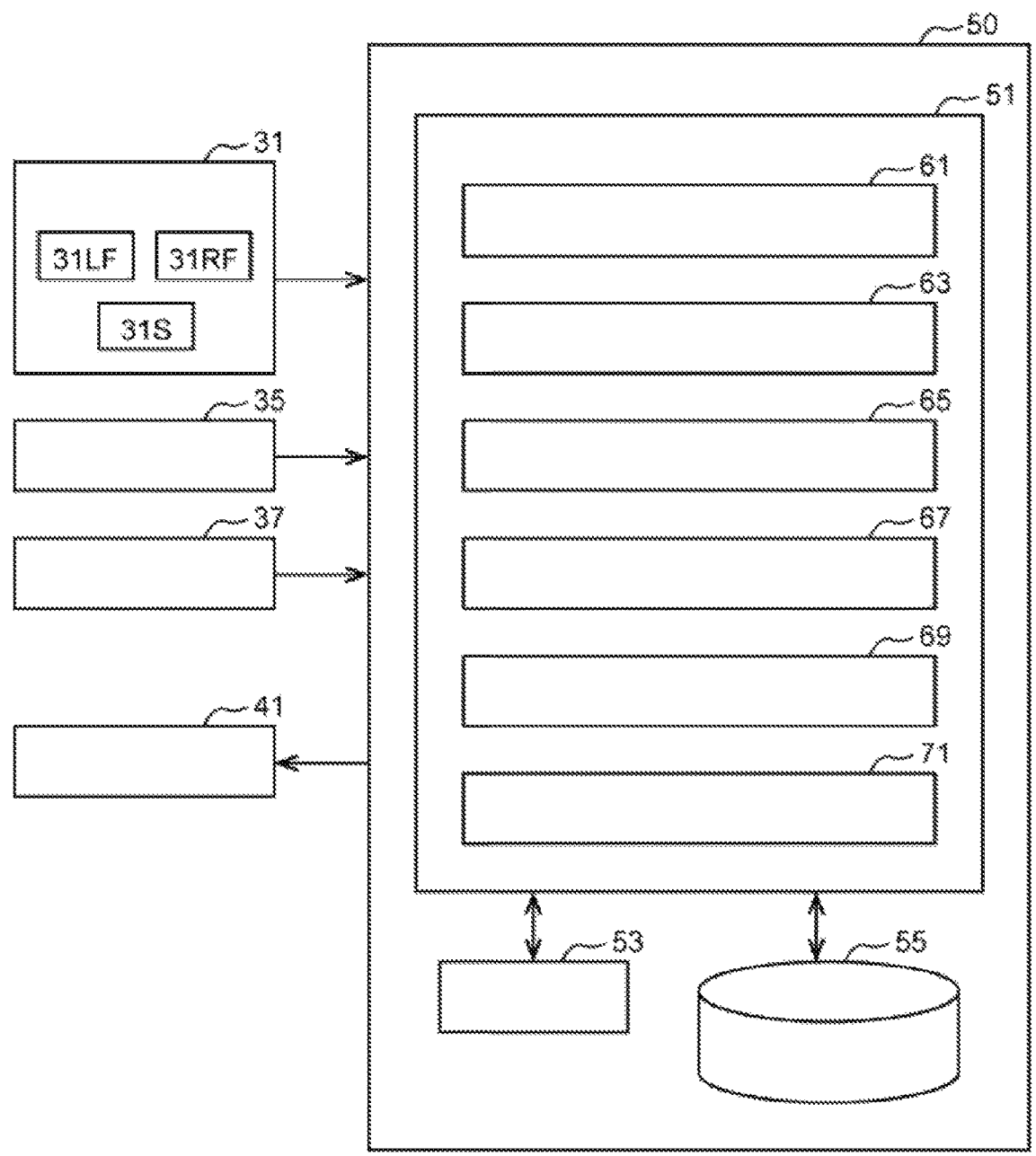

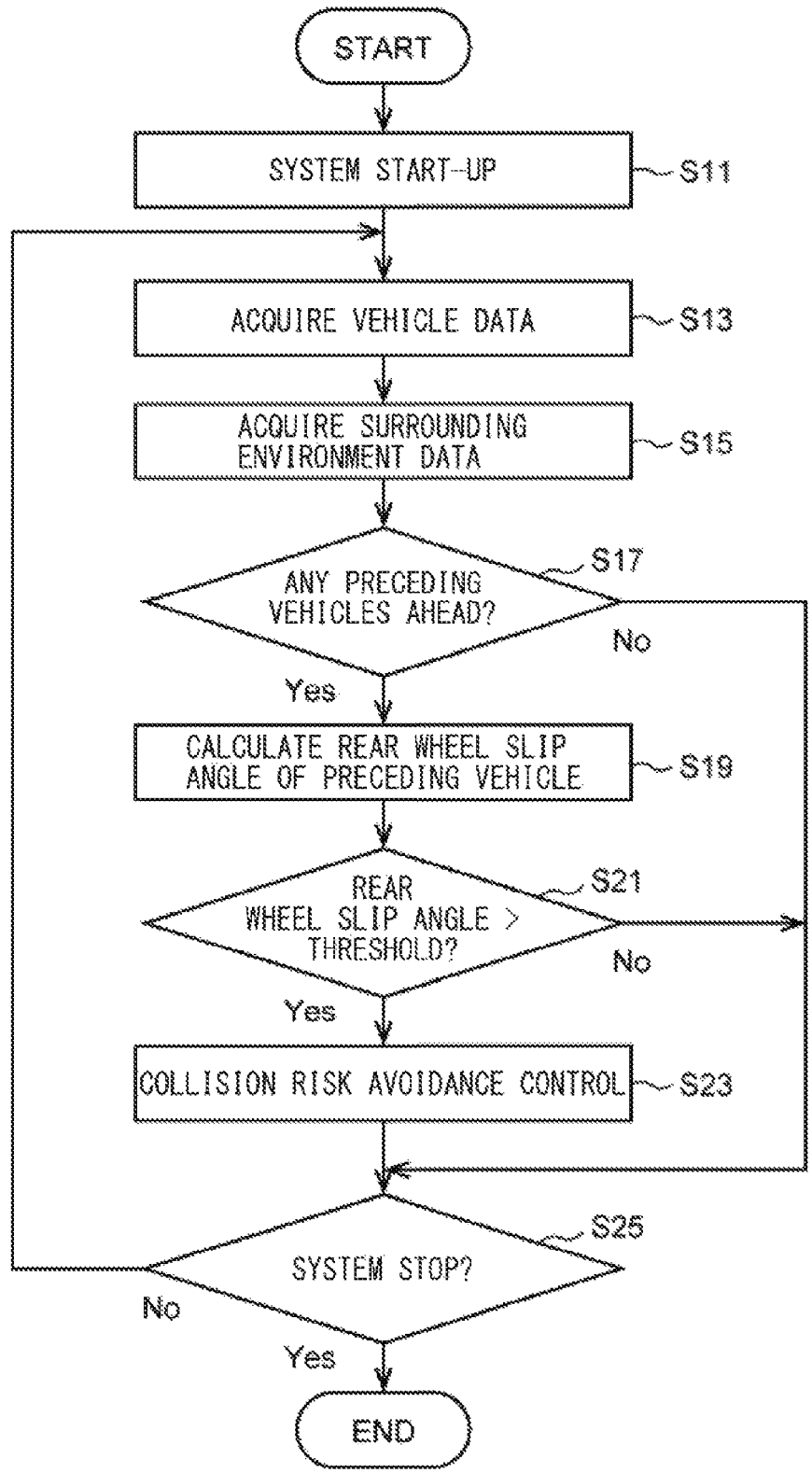

[ FIG. 4 ]
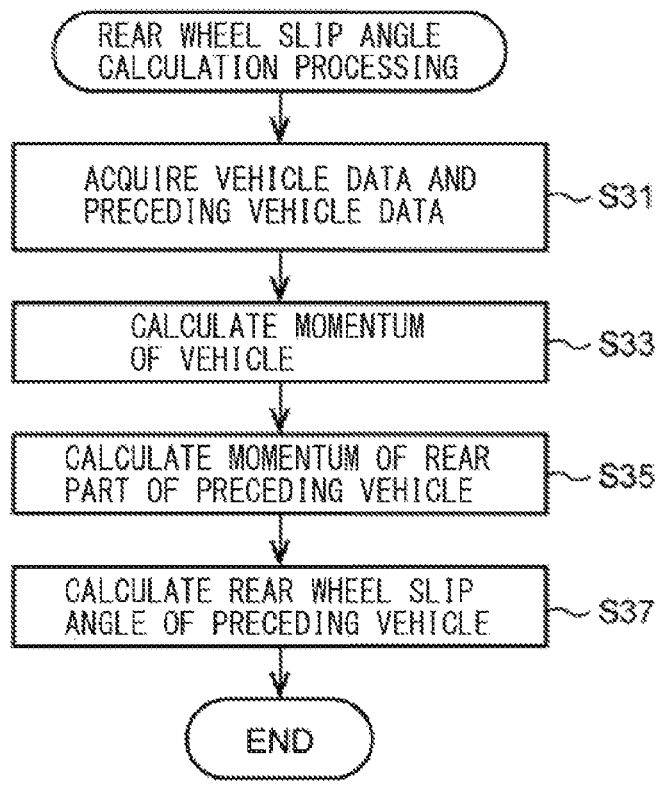
[ FIG. 5 ]
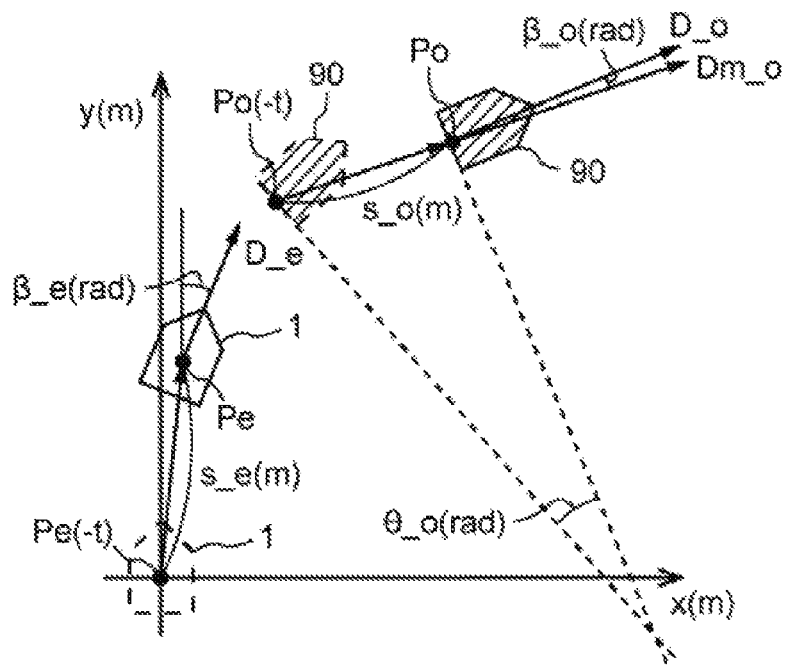

[ FIG. 6 ]
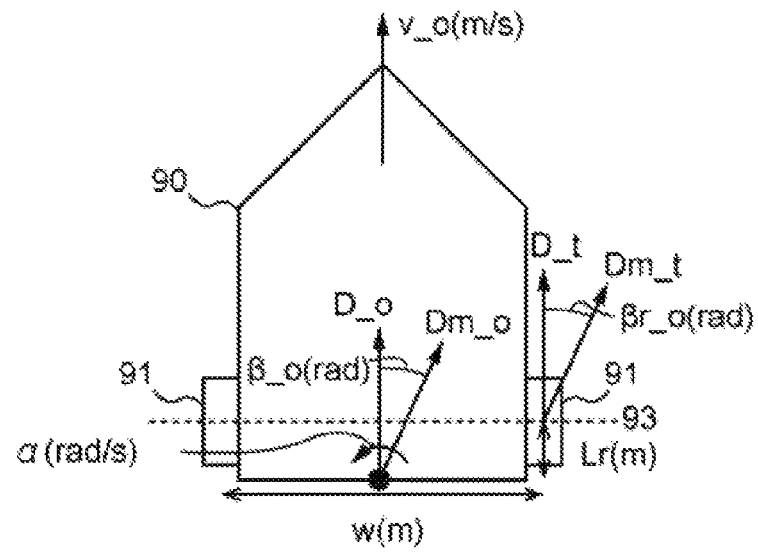
[ FIG. 7 ]
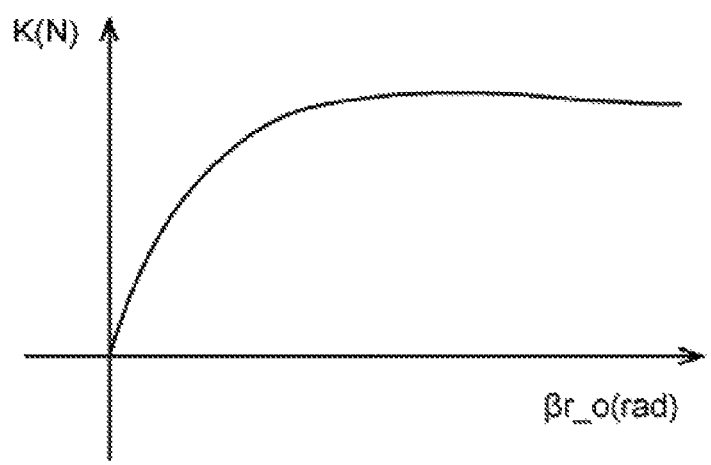

[FIG. 8]
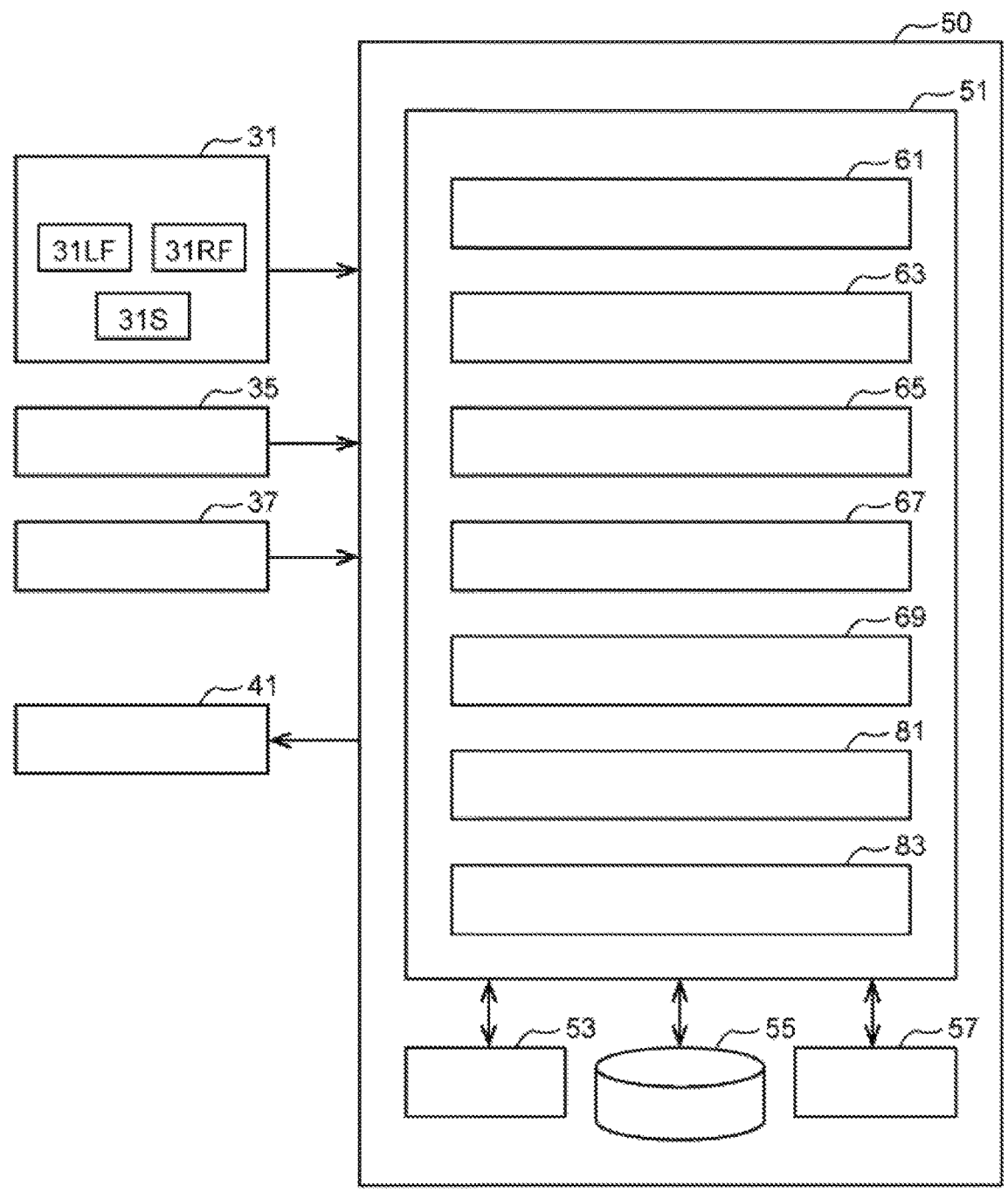

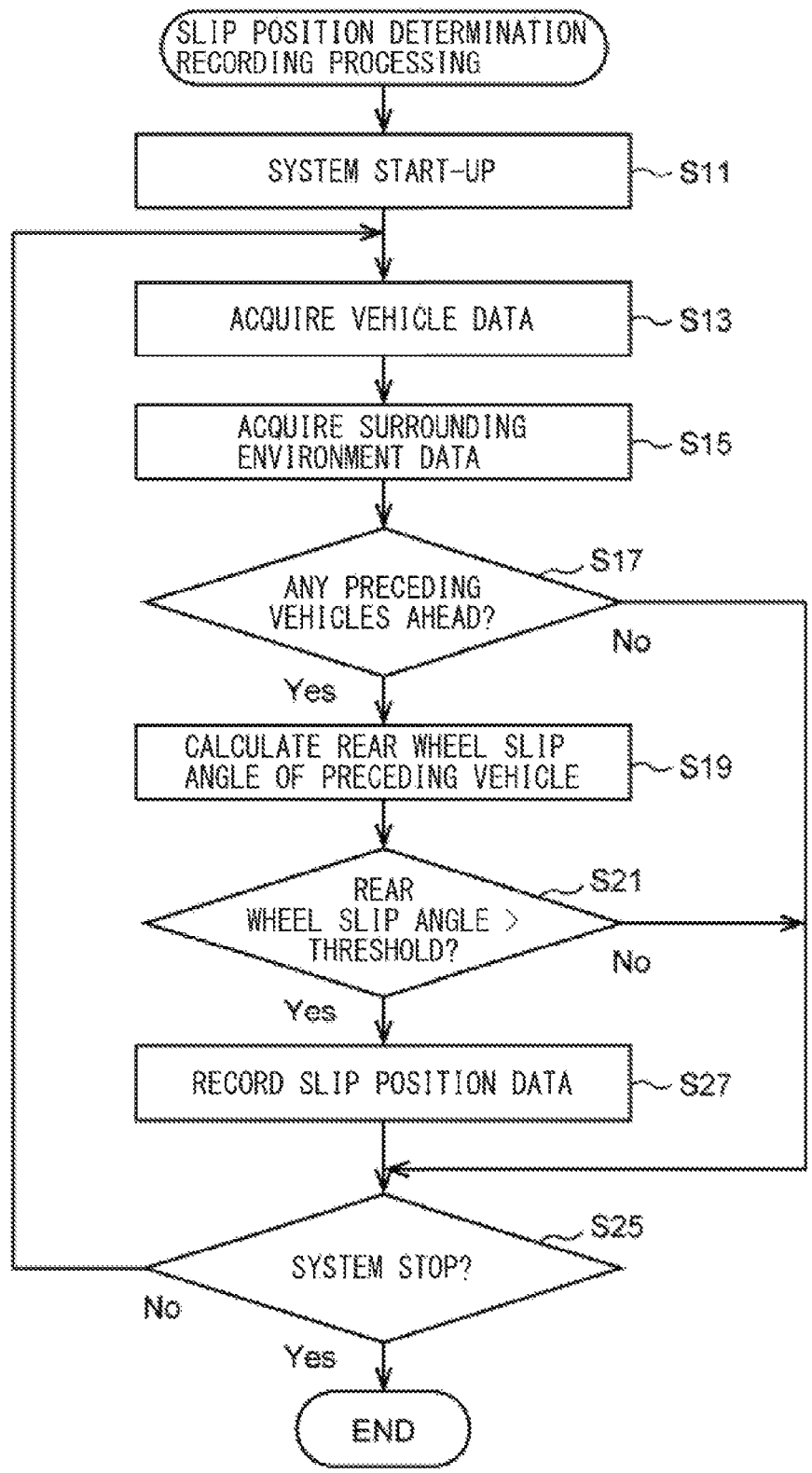

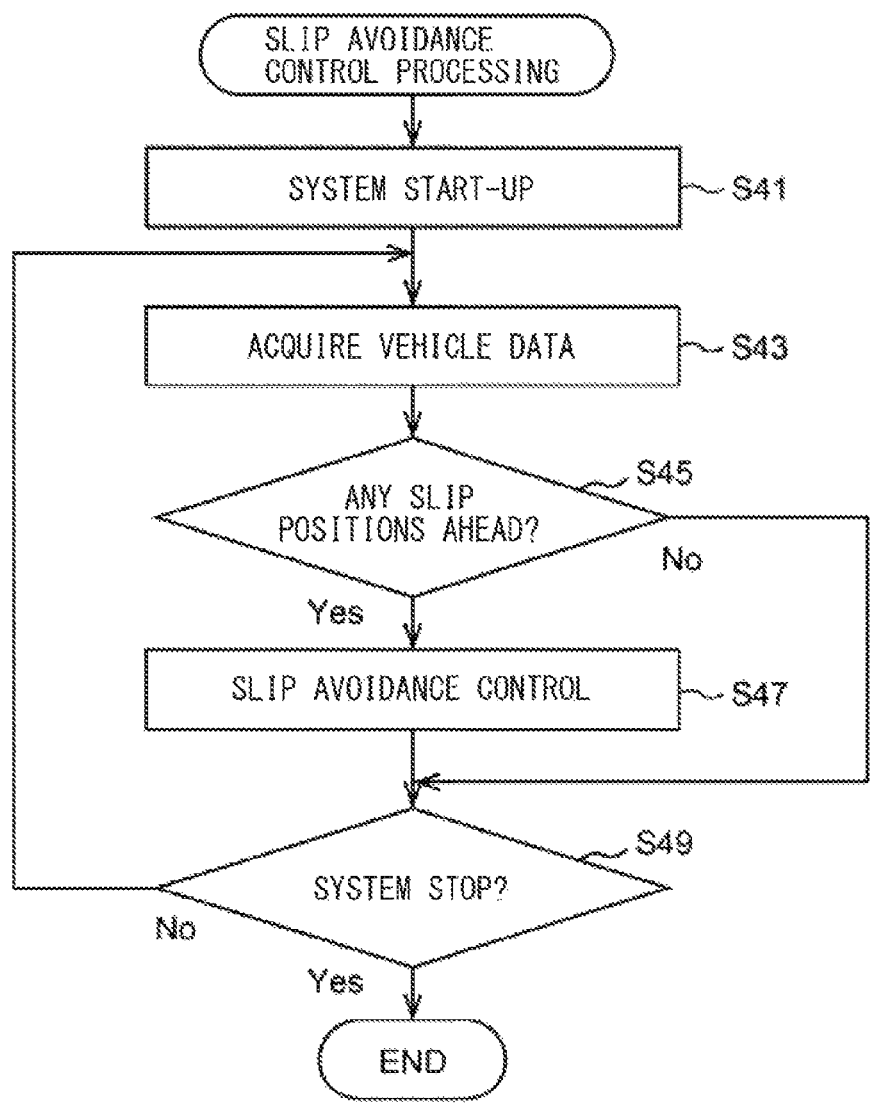
[ FIG. 10 ]

DRIVER ASSISTANCE APPARATUS AND RECORDING MEDIUM CONTAINING COMPUTER PROGRAM

CROSS REFERENCE TO RELATED APPLICATIONS

This application is the U.S. National Phase under 35 US.C. § 371 of International Application No. PCT/JP2021/035443, filed on Sep. 27, 2021, the entire contents of each are hereby incorporated by reference.

TECHNICAL FIELD

The disclosure relates to a driver assistance apparatus and a recording medium containing a computer program that assist in driving a vehicle.

BACKGROUND ART

Recently, the practical application of vehicles equipped with a driver assistance function and an automated driving function has been promoted mainly for the purpose of reduction in traffic accidents and reduction in a burden of driving. For example, apparatuses have been known that detect an obstacle present around the vehicle on the basis of detection data and assist in driving a vehicle, to avoid collision between the vehicle and the obstacle. The detection data is detected by various sensors that detect data regarding surrounding environment around the vehicle, e.g., a vehicle outside capturing camera and LiDAR (Light Detection and Ranging) provided in the vehicle.

For example, Patent Literature 1 discloses a vehicle control system that calculates a relative slip angle between a preceding vehicle and a vehicle, on the basis of a distance from the vehicle to the preceding vehicle, and a distance from a virtual line in a direction of travel to the preceding vehicle. The virtual line in the direction of travel extends from the vehicle in the direction of travel. On the basis of the relative slip angle, the vehicle control system sets a spinning determination threshold. In a case where the relative slip angle exceeds the spinning determination threshold, the vehicle control system controls a yaw moment to reduce the relative slip angle. Moreover, Patent Literature 2 discloses a technique in which a travel locus prediction apparatus mounted on a vehicle analyzes a parallax image captured by a stereo camera, to detect a direction of a vehicle body surface of a preceding vehicle. The travel locus prediction apparatus calculates a yaw rate of the preceding vehicle from a change in the direction of the vehicle body surface of the preceding vehicle, and calculates a speed of the preceding vehicle from a change in a position of the preceding vehicle. The travel locus prediction apparatus predicts a future travel locus of the preceding vehicle with the use of the yaw rate and the speed of the preceding vehicle.

CITATION LIST

Patent Literature

Patent Literature 1: Japanese Unexamined Patent Application Publication No. 2015-000655

Patent Literature 2: Japanese Unexamined Patent Application Publication No. 2018-097644

SUMMARY OF INVENTION

Problem to be Solved by the Invention

However, the vehicle control system disclosed in Patent Literature 1 is intended to predict spinning of the vehicle to ensure stability of behavior of the vehicle, but does not predict spinning of the preceding vehicle. Moreover, the technique disclosed in Patent Literature 2 includes predicting the future travel locus of the preceding vehicle with the use of the yaw rate and the speed of the preceding vehicle, but does not include predicting the spinning of the preceding vehicle. Making it possible to predict, in advance, the spinning of a random vehicle present ahead while the vehicle is traveling would conceivably lead to reduction in risk that the vehicle collides with the random vehicle, and to alleviation of damage to be incurred by the collision.

The disclosure is made in view of such a problem, and it is an object of the disclosure to provide a driver assistance apparatus and a recording medium containing a computer program that make it possible to predict, in advance, spinning of a random vehicle present ahead of a vehicle.

Means for Solving the Problem

To solve the above-described problem, according to an aspect of the disclosure, a driver assistance apparatus for a vehicle is provided. The driver assistance apparatus includes: one or more processors: and one or more memories communicably coupled to the one or more processors. The processors calculate a vehicle speed of a random vehicle present ahead of the vehicle, and momentum of a front part or a rear part of the random vehicle, on the basis of detection data by a surrounding environment sensor that detects data regarding surrounding environment around the vehicle. The processors estimate a slip angle or a slip angular speed of a rear wheel of the random vehicle, on the basis of data regarding at least the vehicle speed of the random vehicle and the momentum of the front part or the rear part of the random vehicle, and data regarding an estimated distance from the rear wheel of the random vehicle to the front part or the rear part of the random vehicle.

To solve the above-described problem, according to an aspect of the disclosure, a driver assistance apparatus for a vehicle is provided. The driver assistance apparatus includes: a random vehicle momentum calculation unit that calculates a vehicle speed of a random vehicle present ahead of a vehicle, and momentum of a front part or a rear part of the random vehicle, on the basis of detection data by a surrounding environment sensor that detects data regarding surrounding environment around the vehicle; and a wheel slip angle estimation unit that estimates a slip angle or a slip angular speed of a rear wheel of the random vehicle, on the basis of data regarding at least the vehicle speed of the random vehicle and the momentum of the front part or the rear part of the random vehicle, and data regarding an estimated distance from the rear wheel of the random vehicle to the front part or the rear part of the random vehicle.

Moreover, to solve the above-described problem, according to another aspect of the disclosure, a recording medium containing a computer program applicable to a driver assistance apparatus for a vehicle is provided. The computer program causes one or more processors to carry out processing including: calculating a vehicle speed of a random vehicle present ahead of the vehicle, and momentum of a front part or a rear part of the random vehicle, on the basis of detection data by a surrounding environment sensor that detects data regarding surrounding environment around the vehicle: and estimating a slip angle or a slip angular speed of a rear wheel of the random vehicle, on the basis of data regarding at least the vehicle speed of the random vehicle and the momentum of the front part or the rear part of the random vehicle, and data regarding an estimated distance from the rear wheel of the random vehicle to the front part or the rear part of the random vehicle.

Effects of the Invention

As described above, according to the disclosure, it is possible to predict, in advance, spinning of a random vehicle present ahead of a vehicle.

BRIEF DESCRIPTION OF DRAWINGS

FIG. 1 is a schematic diagram that illustrates a configuration example of a vehicle including a driver assistance apparatus according to a first embodiment of the disclosure.

FIG. 2 is a block diagram that illustrates a configuration example of the driver assistance apparatus according to the embodiment.

FIG. 3 is a flowchart of processing to be carried out by a processor of the driver assistance apparatus according to the embodiment.

FIG. 4 is a flowchart of rear wheel slip angle calculation processing according to the embodiment.

FIG. 5 is an explanatory diagram that illustrates how to obtain a slip angle of the center of a rear part of a preceding vehicle according to the embodiment.

FIG. 6 is an explanatory diagram that illustrates how to obtain a slip angle of a rear wheel of the preceding vehicle according to the embodiment.

FIG. 7 is an explanatory diagram that illustrates relation between a slip angle of a wheel and a cornering force.

FIG. 8 is a block diagram that illustrates a configuration example of a driver assistance apparatus according to a second embodiment of the disclosure.

FIG. 9 is a flowchart of slip position determination recording processing according to the embodiment.

FIG. 10 is a flowchart of slip avoidance processing according to the embodiment.

MODES FOR CARRYING OUT THE INVENTION

In the following, some preferred embodiments of the disclosure are described in detail with reference to the accompanying drawings. Note that throughout the present description and the drawings, constituent elements having substantially the same function and configuration are denoted with the same reference numerals to avoid any redundant description.

1. First Embodiment

First, description is given of a driver assistance apparatus according to a first embodiment of the disclosure. The driver assistance apparatus according to the first embodiment is configured to carry out a control of: estimating a slip angle or a slip angular speed of a rear wheel or a front wheel of a preceding vehicle present ahead of a vehicle on which the driver assistance apparatus is mounted: and predicting spinning of the preceding vehicle to avoid risk that the vehicle collides with a random vehicle.

It is to be noted that, in the present description, a slip of a wheel refers to a state in which a tire slips on a road surface. Spinning of a vehicle refers to a state in which a longitudinal direction of a vehicle and a movement-wise direction of the vehicle do not coincide. Moreover, a slip angle of a rear wheel refers to an angle formed by the movement-wise direction of the vehicle and a longitudinal direction of the rear wheel as the vehicle is viewed in a vertical direction.

1-1. Overall Configuration of Vehicle

First, description is given of an example of an overall configuration of a vehicle including the driver assistance apparatus according to the present embodiment. FIG. 1 is a schematic diagram that illustrates a configuration example of a vehicle 1 including a driver assistance apparatus 50. The vehicle 1 illustrated in FIG. 1 is constituted as a four-wheel drive vehicle that transmits driving torque to a left front wheel 3LF, a right front wheel 3RF, a left rear wheel 3LR, and a right rear wheel 3RR (in the following, collectively referred to as "wheels 3" unless distinction is particularly necessary). The driving torque is outputted from a driving force source 9 that generates the driving torque for the vehicle 1. The driving force source 9 may be an internal combustion engine such as a gasoline engine or a diesel engine, or may be a driving motor. The driving force source 9 may include an internal combustion engine and a driving motor together.

It is to be noted that the vehicle 1 may be a two-wheel automobile that transmits driving torque outputted from the driving force source 9 to either a front wheel or a rear wheel. Moreover, the vehicle 1 may be an electric vehicle including two driving motors, e.g., a front wheel driving motor and a rear wheel driving motor, or may be an electric vehicle including driving motors that correspond to the respective wheels 3. Moreover, in a case where the vehicle 1 is an electric vehicle or a hybrid electric vehicle, a secondary battery, and a generator such as a motor and a fuel cell are mounted on the vehicle 1. The secondary battery accumulates electric power to be supplied to the driving motor. The generator generates electric power to be charged in the battery.

The vehicle 1 includes the driving force source 9, an electric steering device 15, and a brake hydraulic control unit 20, as devices to be used in a driving control of the vehicle 1. The driving force source 9 outputs the driving torque to be transmitted to a front wheel driving shaft 5F and a rear wheel driving shaft 5R through an unillustrated transmission, a front wheel differential mechanism 7F, and a rear wheel differential mechanism 7R. Driving of the driving force source 9 and the transmission is controlled by a vehicle control device 41 including one or more electronic control units (ECU: Electronic Control Unit).

The electric steering device 15 is provided on the front wheel driving shaft 5F. The electric steering device 15 includes an unillustrated electric motor and an unillustrated gear mechanism. The electric steering device 15 is controlled by the vehicle control device 41 to adjust steering angles of the left front wheel 3LF and the right front wheel 3RF. In manual driving, the vehicle control device 41 controls the electric steering device 15 on the basis of a steering angle of a steering wheel 13 by a driver. Moreover, in automated driving, the vehicle control device 41 controls the electric steering device 15 on the basis of a target steering angle to be set by a control device that administers the automated driving.

A brake system of the vehicle 1 is constituted as a hydraulic brake system. The brake hydraulic control unit 20 adjusts hydraulic pressure to be supplied to each of brake calipers 17LF, 17RF, 17LR, and 17RR (hereinafter, collectively referred to as "brake calipers 17" unless distinction is particularly necessary) provided respectively on the front, rear, left, and right drive wheels 3LF, 3RF, 3LR, and 3RR, to generate a braking force. Driving of the brake hydraulic control unit 20 is controlled by the vehicle control device 41. In the case where the vehicle 1 is an electric vehicle or a hybrid electric vehicle, the brake hydraulic control unit 20 is used in conjunction with a regenerative brake by the driving motor.

The vehicle control device 41 includes one or more electronic control devices that control driving of the driving force source 9, the electric steering device 15, and the brake hydraulic control unit 20. The driving force source 9 outputs the driving torque for the vehicle 1. The electric steering device 15 controls the steering angle of the steering wheel 13 or a steering wheel. The brake hydraulic control unit 20 controls the braking force of the vehicle 1. The vehicle control device 41 may have a function of controlling the driving of the transmission that performs shifting of an output outputted from the driving force source 9 and transmits the resultant output to the wheels 3.

The vehicle control device 41 is configured to acquire data transmitted from the control device that administers the automated driving, and is configured to carry out an automated driving control of the vehicle 1. Moreover, in the manual driving of the vehicle 1, the vehicle control device 41 acquires data regarding an amount of an operation by the driving by the driver, and controls the driving of the driving force source 9, the electric steering device 15, and the brake hydraulic control unit 20. The driving force source 9 outputs the driving torque for the vehicle 1. The electric steering device 15 controls the steering angle of the steering wheel 13 or the steering wheel. The brake hydraulic control unit 20 controls the braking force of the vehicle 1. Furthermore, in the present embodiment, in the automated driving and the manual driving of the vehicle 1, the vehicle control device 41 is configured to carry out a collision risk avoidance control on the basis of the data transmitted from the driver assistance apparatus 50.

Moreover, the vehicle 1 includes forward view capturing cameras 31LF and 31RF, LiDAR (Light Detection And Ranging) 31S, a vehicle state sensor 35, and a GNSS (Global Navigation Satellite System) sensor 37.

The forward view capturing cameras 31LF and 31RF, and the LiDAR 31S constitute a surrounding environment sensor to acquire data regarding surrounding environment around the vehicle 1. The forward view capturing cameras 31LF and 31RF capture a forward view of the vehicle 1 and generate image data. The forward view capturing cameras 31LF and 31RF include imaging elements such as CCD (Charged-Coupled Devices) or CMOS (Complementary Metal-Oxide-Semiconductor), and transmit the generated image data to the driver assistance apparatus 50.

In the vehicle 1 illustrated in FIG. 1, the forward view capturing cameras 31LF and 31RF constitute a stereo camera including a pair of left and right cameras. However, the forward view capturing cameras 31LF and 31RF may each be a monocular camera. In addition to the forward view capturing cameras 31LF and 31RF, the vehicle 1 may include, for example, a rearward view capturing camera, or a left or right rearward view capturing camera. The rearward view capturing camera is provided in a rear part of the vehicle 1 and captures a rearward view. The left or right rearward view capturing camera is provided on a side mirror 11L or 11R.

The LiDAR 31S transmits optical waves and receives reflected waves of the optical waves, and detects an obstacle, a distance to the obstacle, and a position of the obstacle on the basis of time from the transmission of the optical waves to the reception of the reflected waves. The LiDAR 31S transmits detection data to the driver assistance apparatus 50. In place of the LiDAR 31S, or together with the LiDAR 31S, the vehicle 1 may include any one or more sensors out of a radar sensor such as millimeter wave radar, and an ultrasonic sensor, as the surrounding environment sensor that acquires data regarding the surrounding environment.

The vehicle state sensor 35 includes one or more sensors that detect an operation state and behavior of the vehicle 1. The vehicle state sensor 35 includes, for example, at least one of a steering angle sensor, an accelerator position sensor, a brake stroke sensor, a brake pressure sensor, or an engine speed sensor, and detects the operation state of the vehicle 1 such as the steering angle of the steering wheel 13 or the steering wheel, an accelerator position, an amount of a brake operation, or an engine speed. Moreover, the vehicle state sensor 35 includes, for example, at least one of a vehicle speed sensor, an acceleration rate sensor, or an angular speed sensor, and detects the behavior of the vehicle such as a vehicle speed, a longitudinal acceleration rate, a lateral acceleration rate, and a yaw rate. The vehicle state sensor 35 transmits a sensor signal including the detected data, to the driver assistance apparatus 50.

The GNSS sensor 37 receives satellite signals transmitted from a plurality of satellites and detects a position of the GNSS sensor 37, that is, a position of the vehicle 1. The GNSS sensor 37 transmits detected positional data regarding the vehicle 1 to the driver assistance apparatus 50.

1-2. Driver Assistance Apparatus

Next, the driver assistance apparatus 50 according to the present embodiment is described in detail.

In the following, an example is described where processing is carried out that includes predicting, in advance, spinning of a preceding vehicle traveling ahead of the vehicle 1, and reducing risk of collision between the vehicle 1 and the preceding vehicle. In the following description, the vehicle 1 as a target of the assistance on which the driver assistance apparatus 50 is mounted is referred to as the vehicle, while a vehicle around the vehicle 1 is referred to as a random vehicle.

1-2-1. Configuration Example

FIG. 2 is a block diagram illustrating a configuration example of the driver assistance apparatus 50 according to the present embodiment.

To the driver assistance apparatus 50, the surrounding environment sensor 31 and the vehicle state sensor 35 are coupled through a dedicated line, or communication means such as CAN (Controller Area Network) or LIN (Local Inter Net). Moreover, to the driver assistance apparatus 50, the vehicle control device 41 is coupled through a dedicated line, or the communication means such as CAN or LIN. It is to be noted that the driver assistance apparatus 50 is not limited to an electronic control device mounted on the vehicle 1, but may be a terminal device such as a smartphone or a wearable device.

The driver assistance apparatus 50 includes a processor 51, a storage 53, and a distance data database 55. The processor 51 includes one or more processors such as a CPU (Central Processing Unit). A portion or all of the processor 51 may include an updatable one such as firmware, or may be, for example, a program module to be executed in accordance with a command from, for example, a CPU. The storage 53 includes a memory such as a RAM (Random Access Memory) or a ROM (Read Only Memory). However, there is no particular limitation on the number of the storages 53 and the kind of the storage 53. The storage 53 holds a computer program to be executed by the processor 51, and data to be used in calculation processing, e.g., various parameters, detection data, and calculation results.

The driver assistance apparatus 50 functions as an apparatus that assists in driving the vehicle 1 by allowing the one or more processors to execute the computer program. The computer program is a computer program that causes the processors to perform operation described later to be performed by the driver assistance apparatus 50. The computer program to be executed by the processors may be contained in a recording medium functioning as the storage 53 (memory) provided in the driver assistance apparatus 50. Alternatively, the computer program to be executed by the processors may be contained in a recording medium built in the driver assistance apparatus 50, or any recording medium externally attachable to the driver assistance apparatus 50.

The recording medium containing the computer program may be: a magnetic medium such as a hard disk, a floppy disk, and a magnetic tape: an optical recording medium such as a CD-ROM (Compact Disk Read Only Memory), a DVD (Digital Versatile Disk), an SSD (Solid State Drive), and a Blu-ray (registered trademark): a magnetic-optical medium such as a floptical disk: a storage element such as a RAM and a ROM: a flash memory such as a USB (Universal Serial Bus) memory; or any other medium that is able to hold programs.

1-2-2. Distance Data Database

The distance data database 55 includes a memory such as a RAM, or an updatable recording medium such as an HDD, a CD-ROM, a DVD, an SSD, a USB memory, or a storage device. However, there is no particular limitation on the kind of the recording medium. A portion or all of the distance data database 55 may be mounted on the vehicle 1, or may be held in an external device such as a server that is able to communicate with the driver assistance apparatus 50 through wireless communication means such as mobile communication.

The distance data database 55 holds reference data regarding a longitudinal distance Lr between an axle of the rear wheel of the vehicle and the rear part of the vehicle, for each kind of vehicles such as mini-cars, passenger cars, SUVs, wagons, trucks, and buses. The longitudinal distance Lr between the axle of the rear wheel of the vehicle and the rear part of the vehicle may be an average value depending on the kind of vehicle. The kind of the vehicle may be distinguished by the kind of the vehicle that is distinguishable by at least imaging data by the forward view capturing cameras 31LF and 31RF. For example, trucks and buses differ in a vehicle length depending on maximum loading capacity and the number of seats. But a size of a truck or a bus does not have to be distinguished in a case where the vehicle length is undistinguishable on the basis of the imaging data regarding a rear part of the truck or the bus acquired by the forward view capturing cameras 31LF and 31RF.

In the present embodiment, the distance data database 55 holds two different pieces of the reference data, i.e., a first distance Lr1 and a second distance Lr2. The first distance Lr1 and the second distance Lr2 may be a maximum distance and a minimum distance assumed in common vehicles, for each kind of vehicles, but there is no particular limitation. For example, they may be two values obtained by adding or subtracting any distance to or from an average value of the distance assumed in common vehicles, or may be two values obtained by multiplying the average value of the distance by any coefficients.

1-2-3. Functional Configuration

The processor 51 of the driver assistance apparatus 50 includes a surrounding environment detection unit 61, a vehicle data acquisition unit 63, a vehicle momentum calculation unit 65, a random vehicle momentum calculation unit 67, a wheel slip angle estimation unit 69, and a risk avoidance controller 71. These units may each be a function to be realized by execution of a computer program by a processor such as a CPU. However, some of these units may include an analog circuit. In the following, after brief description of the function of each unit of the processor 51, specific processing operation is described.

(Surrounding Environment Detection Unit)

The surrounding environment detection unit 61 detects the surrounding environment around the vehicle 1 on the basis of the detection data transmitted from the surrounding environment sensor 31. Specifically, the surrounding environment detection unit 61 calculates a kind, a size (width, height, and depth), a position, and a speed of an obstacle present around the vehicle 1, a distance from the vehicle 1 to the obstacle, and a relative speed between the vehicle 1 and the obstacle. The obstacle to be detected includes a random vehicle traveling, a parked vehicle, pedestrians, bicycles, sidewalls, curb stones, buildings, utility poles, traffic signs, traffic lights, natural objects, and any other objects present around the vehicle 1. In the present embodiment, the surrounding environment detection unit 61 detects at least a preceding vehicle traveling ahead the vehicle 1, and calculates a size, a position, a direction, and a vehicle speed of the preceding vehicle, and a distance from the vehicle 1 to the preceding vehicle, and a relative speed between the vehicle 1 and the preceding vehicle. The surrounding environment detection unit 61 detects the data regarding the surrounding environment on predetermined cycles, and records the data in the storage 53.

(Vehicle Data Acquisition Unit)

The vehicle data acquisition unit 63 acquires data regarding the operation state and the behavior of the vehicle 1 on the basis of the detection data transmitted from the vehicle state sensor 35. The vehicle data acquisition unit 63 acquires the data regarding the operation state of the vehicle 1 such as the steering angle of the steering wheel or the steering wheel, the accelerator position, the amount of the brake operation, or the engine speed, and the data regarding the behavior of the vehicle 1 such as the vehicle speed, the longitudinal acceleration rate, the lateral acceleration rate, and the yaw rate, on predetermined calculation cycles. Moreover, the vehicle data acquisition unit 63 acquires the positional data transmitted from the GNSS sensor 37. The vehicle data acquisition unit 63 records these pieces of the acquired data in the storage 53.

(Vehicle Momentum Calculation Unit)

The vehicle momentum calculation unit 65 calculates momentum of the vehicle 1. In the present embodiment, the vehicle momentum calculation unit 65 obtains, by calculation, an amount of movement s_e (m) of the vehicle 1 and an amount of change β_e (rad) in a longitudinal direction of the vehicle 1, on predetermined cycles. For example, the vehicle momentum calculation unit 65 calculates the amount of movement of the vehicle 1 on the basis of a change in the position of the vehicle 1 detected by the GNSS sensor 37. Moreover, the vehicle momentum calculation unit 65 carries out processing such as ICP (Iterative Closest Point) matching on the basis of the detection data by the LiDAR 31S, and detects the amount of movement of the vehicle 1 and the amount of change in the longitudinal direction of the vehicle 1 on the basis of changes in a distance to the same detection target and an angle of the detection target.

It is to be noted that the vehicle momentum calculation unit 65 may estimate the amount of movement of the vehicle 1 and the amount of change in the longitudinal direction of the vehicle 1 on the basis of data regarding traveling states of the vehicle 1, e.g., the steering angle, the vehicle speed, the acceleration rate, and the yaw rate.

(Random Vehicle Momentum Calculation Unit)

The random vehicle momentum calculation unit 67 calculates momentum of a rear part of the preceding vehicle detected by the surrounding environment detection unit 61. In the present embodiment, the random vehicle momentum calculation unit 67 obtains, by calculation, an amount of movement s_o (m) and a slip angle β_o (rad) of a center (lateral center) of the rear part of the preceding vehicle, on predetermined cycles. The random vehicle momentum calculation unit 67 calculates the amount of movement s_o of the center of the rear part of the preceding vehicle at any preset time t, on the basis of the detection data transmitted from the surrounding environment sensor 31. Moreover, the random vehicle momentum calculation unit 67 calculates an angle formed by a longitudinal direction D_o of the preceding vehicle at certain time and a movement-wise direction Dm_o of the center of the rear part of the preceding vehicle at any time t as mentioned above, as the slip angle β_o of the center of the rear part of the preceding vehicle. Any time t may be a calculation cycle of the processor constituting the processor 51, or may be set at any value.

(Wheel Slip Angle Estimation Unit)

The wheel slip angle estimation unit 69 estimates a slip angle βr_o (rad) of a rear wheel of the preceding vehicle detected by the surrounding environment detection unit 61. Because spinning of a vehicle is caused by a slip of a wheel, predicting the spinning of the preceding vehicle on the basis of the slip angle of the wheel makes it possible to enhance accuracy of prediction of the spinning of the preceding vehicle, as compared with a case where the spinning of the preceding vehicle is predicted from the behavior of the vehicle itself. Moreover, a front wheel is a steering wheel, and in many cases, the longitudinal direction of the vehicle does not coincide with a direction of the front wheel. Accordingly, in the present embodiment, the slip angle βr_o of the rear wheel is estimated.

(Risk Avoidance Controller)

The risk avoidance controller 71 carries out a control of avoiding the risk of collision between the vehicle 1 and the preceding vehicle, in a case where the spinning of the preceding vehicle is predicted to occur on the basis of the slip angle βr_o of the rear wheel of the preceding vehicle estimated by the wheel slip angle estimation unit 69. Specifically, the risk avoidance controller 71 predicts whether or not the preceding vehicle spins, on the basis of the slip angle βr_o of the rear wheel of the preceding vehicle. In a case where the spinning is predicted to occur, the risk avoidance controller 71 decelerates the vehicle 1 to reduce the risk of collision. Instead of decelerating the vehicle 1 or in combination with decelerating the vehicle 1, the risk avoidance controller 71 may correct a locus of the vehicle 1 to reduce the risk of collision. However, it is preferable to give priority to decelerating the vehicle 1 because there are cases where the direction of the movement of the preceding vehicle is unpredictable.

1-3. Operation of Driver Assistance Apparatus

Next, an operation example of the driver assistance apparatus 50 according to the present embodiment is described in detail.

FIG. 3 is a flowchart illustrating an example of processing to be carried out by the processor 51 of the driver assistance apparatus 50.

First, upon a start-up of an on-vehicle system including the driver assistance apparatus 50 (step S11), the vehicle data acquisition unit 63 of the processor 51 acquires the data regarding the vehicle 1 (step S13). Specifically, the vehicle data acquisition unit 63 acquires the data regarding the operation state and the behavior of the vehicle 1 on the basis of the detection data transmitted from the vehicle state sensor 35. The vehicle data acquisition unit 63 acquires at least the data regarding the operation state of the vehicle 1 such as the steering angle of the steering wheel or the steering wheel, the accelerator position, the amount of the brake operation, or the engine speed, and the data regarding the behavior of the vehicle 1 such as the vehicle speed, the longitudinal acceleration rate, the lateral acceleration rate, and the yaw rate. Moreover, the vehicle data acquisition unit 63 acquires the positional data transmitted from the GNSS sensor 37. The vehicle data acquisition unit 63 records these pieces of the acquired data in the storage 53.

Next, the surrounding environment detection unit 61 of the processor 51 acquires surrounding environment data around the vehicle 1 (step S15). Specifically, the surrounding environment detection unit 61 detects an obstacle present around the vehicle 1 on the basis of the detection data transmitted from the surrounding environment sensor 31. In the present embodiment, the surrounding environment detection unit 61 detects at least the preceding vehicle traveling ahead of the vehicle 1. Moreover, the surrounding environment detection unit 61 calculates the position, the size, the direction, and the vehicle speed of the preceding vehicle detected, the distance from the vehicle 1 to the preceding vehicle, and the relative speed between the vehicle 1 and the preceding vehicle. The size of the preceding vehicle includes at least a length of a vehicle width of the rear part of the preceding vehicle.

For example, the surrounding environment detection unit 61 detects an obstacle ahead of the vehicle 1 and the kind of the obstacle with the use of, for example, a pattern matching technique, by performing image processing on the image data transmitted from the forward view capturing cameras 31LF and 31RF. Moreover, the surrounding environment detection unit 61 calculates the position and the size of the obstacle as viewed from the vehicle 1, and the distance to the obstacle, on the basis of the position of the obstacle in the image data, a size of an occupied area by the obstacle in the image data, and data regarding parallax of the left and right forward view capturing cameras 31LF and 31RF. Furthermore, the surrounding environment detection unit 61 calculates the relative speed between the vehicle 1 and the obstacle by time differentiating a change in the distance, and calculates a speed of the obstacle on the basis of the data regarding the relative speed and the data regarding the vehicle speed of the vehicle 1.

Moreover, the surrounding environment detection unit 61 may detect the obstacle on the basis of the detection data transmitted from the LiDAR 31S. For example, the surrounding environment detection unit 61 may calculate the position, the kind, and the size of the obstacle, and the distance from the vehicle 1 to the obstacle, on the basis of data regarding time from transmission of electromagnetic waves from the LiDAR 31S to reception of reflected waves, a direction in which the reflected waves are received, and a range of a group of measured points of the reflected waves. Moreover, the surrounding environment detection unit 61 may calculate the relative speed between the vehicle 1 and the obstacle and the speed of the obstacle, by time differentiating the change in the distance.

Moreover, in a case where the rear part of the random vehicle is recognized on the basis of the image data by the forward view capturing cameras 31LF and 31RF, the surrounding environment detection unit 61 identifies the relevant random vehicle as a preceding vehicle that is not an on-coming vehicle. Furthermore, the surrounding environment detection unit 61 calculates the position of the center of the rear part of the preceding vehicle and the direction of the preceding vehicle on the basis of the detection data by the surrounding environment sensor 31. It is possible to estimate the direction of the preceding vehicle on the basis of an inclination of the rear part of the preceding vehicle relative to, for example, an angle of view of the forward view capturing camera 31LF or 31RF, or the LiDAR 31S. However, a method of obtaining the direction of the preceding vehicle is not limited to the above-mentioned example. The surrounding environment detection unit 61 records the acquired surrounding environment data in the storage 53.

Next, the random vehicle momentum calculation unit 67 of the processor 51 determines presence or absence of any preceding vehicles traveling ahead of the vehicle 1, as an obstacle acquired by the surrounding environment detection unit 61 (step S17). In a case with the absence of any preceding vehicles (S17/No), the processor 51 determines whether or not to stop the on-board system (step S25). Unless the processor 51 stops the on-board system (S25/No), the processor 51 causes the flow to return to step S13 and repeat the processes described above. Meanwhile, in a case with the presence of the preceding vehicle (S17/Yes), the processor 51 obtains, by calculation, the slip angle $\beta r\_o$ of the rear wheel of the preceding vehicle detected (step S19).

Here, with reference to FIGS. 4 to 6, rear wheel slip angle calculation processing is described in detail. The rear wheel slip angle calculation processing includes obtaining, by calculation, the slip angle $\beta r\_o$ of the rear wheel of the preceding vehicle. FIG. 4 is a flowchart of the rear wheel slip angle calculation processing. Moreover, FIG. 5 is an explanatory diagram illustrating a method of obtaining the slip angle $\beta\_o$ of the center of the rear part of the preceding vehicle. FIG. 6 is an explanatory diagram illustrating a method of obtaining the slip angle $\beta r\_o$ of the rear wheel of the preceding vehicle.

First, the processor 51 acquires the data regarding of the vehicle 1 and the data regarding the preceding vehicle held in the storage 53 (step S31). Specifically, the vehicle momentum calculation unit 65 of the processor 51 acquires the positional data by the GNSS sensor 37 and the detection data by the LiDAR 31S acquired and held in the current routine, and the positional data by the GNSS sensor 37 and the detection data by the LiDAR 31S acquired and held in the previous routine. Moreover, the random vehicle momentum calculation unit 67 of the processor 51 acquires data regarding the position of the preceding vehicle, the distance from the vehicle 1 to the preceding vehicle, and the direction of the preceding vehicle, acquired and held in the current routine, and data regarding the position of the preceding vehicle, the distance from the vehicle 1 to the preceding vehicle, and the direction of the preceding vehicle, acquired and held in the previous routine.

Next, on the basis of the acquired data regarding the vehicle 1, the vehicle momentum calculation unit 65 obtains, by calculation, the amount of movement $s\_e$ (m) of the vehicle 1 and the amount of change $\beta\_e$ (rad) in the longitudinal direction of the vehicle 1 (step S33). For example, the vehicle momentum calculation unit 65 calculates the amount of movement of the vehicle 1 on the basis of the change in the position indicated by the positional data by the GNSS sensor 37. Because the positional data by the GNSS sensor 37 includes data regarding positional coordinates on a global coordinate system set in a GNSS system, the vehicle momentum calculation unit 65 calculates a distance between positional coordinates on the occasion of execution of the current routine and positional coordinates on the occasion of execution of the previous routine (t seconds before) and sets the distance as the amount of movement $s\_e$ of the vehicle 1. Moreover, the vehicle momentum calculation unit 65 carries out the processing such as ICP matching on the basis of the detection data by the LiDAR 31S, and calculates the amount of change $\beta\_e$ in the longitudinal direction of the vehicle 1 on the basis of the changes in the distance to the same detection object and the angle of the detection object.

Next, the random vehicle momentum calculation unit 67 obtains, by calculation, the amount of movement $s\_o$ (m) and the slip angle $\beta\_o$ (rad) of the center of the rear part of the preceding vehicle on the basis of data regarding traveling states of the preceding vehicle acquired in the current routine and the previous routine (step S35).

Specifically, as illustrated in FIG. 5, the random vehicle momentum calculation unit 67 plots a position Pe of the vehicle 1 on the occasion of the execution of the current routine, on a coordinate system in which a position Pe(−t) of the vehicle 1 on the occasion of the execution of the previous routine is set as an origin, the longitudinal direction of the vehicle 1 is set as a y-axis, and a vehicle widthwise direction is set as an x-axis. The position Pe of the vehicle 1 on the occasion of the execution of the current routine is obtained on the basis of the amount of movement $s\_e$ of the vehicle 1. Moreover, the random vehicle momentum calculation unit 67 converts the longitudinal direction of the vehicle 1 on the occasion of the execution of the current routine into a vector on the coordinate system on the basis of the amount of change $\beta\_e$ in the longitudinal direction of the vehicle 1, and matches the longitudinal direction D_e of the vehicle 1 with the vector.

Moreover, the random vehicle momentum calculation unit 67 plots, on the coordinate system, a position Po(−t) of the center of the rear part of the preceding vehicle 90 on the occasion of the execution of the previous routine and a position Po of the center of the rear part of the preceding vehicle 90 on the occasion of the execution of the current routine. The position Po(−t) of the center of the rear part of the preceding vehicle 90 on the occasion of the execution of the previous routine and the position Po of the center of the rear part of the preceding vehicle 90 on the occasion of the execution of the current routine are each obtained on the basis of a relative position of the center of the rear part of the preceding vehicle 90 with respect to the vehicle 1. At this occasion, the random vehicle momentum calculation unit 67 converts a longitudinal direction of the preceding vehicle 90 on the occasion of the execution of the current routine, into a vector on the coordinate system, and matches a longitudinal direction D_o of the preceding vehicle 90 with the vector.

The random vehicle momentum calculation unit 67 calculates a distance between the position Po(−t) of the center of the rear part of the preceding vehicle 90 on the occasion of the execution of the previous routine and the position Po of the center of the rear part of the preceding vehicle 90 on the occasion of the execution of the current routine, and sets the distance as the amount of movement s_o. Moreover, the random vehicle momentum calculation unit 67 sets a direction from the position Po(−t) of the center of the rear part of the preceding vehicle 90 on the occasion of the execution of the previous routine toward the position Po of the center of the rear part of the preceding vehicle 90 on the occasion of the execution of the current routine, as the movement-wise direction Dm_o of the preceding vehicle 90. Thus, an angle formed by the longitudinal direction D_o of the preceding vehicle 90 and the movement-wise direction Dm_o of the preceding vehicle 90 is defined as the slip angle β_o of the center of the rear part of the preceding vehicle 90. Furthermore, the random vehicle momentum calculation unit 67 sets an angle formed by two straight lines (broken lines) that pass through the positions Po and Po(−t) of the center of the rear part of the preceding vehicle 90 and are perpendicular to the longitudinal direction of the preceding vehicle 90, as the amount of change θ_o (rad) in the direction of the preceding vehicle 90.

Returning to FIG. 4, next, the wheel slip angle estimation unit 69 of the processor 51 estimates the slip angle βr_o (rad) of the rear wheel of the preceding vehicle 90 (step S37). The wheel slip angle estimation unit 69 estimates, by calculation, the slip angle βr_o (rad) of the rear wheel of the preceding vehicle 90, on the basis of the data regarding the vehicle speed v_o (m/s) of the preceding vehicle 90, the data regarding the amount of movement s_o (m) and the slip angle β_o (rad) of the center of the rear part of the preceding vehicle 90, and the data regarding the longitudinal distance Lr between the axle 93 of the rear wheel 91 of the preceding vehicle 90 and the rear part of the preceding vehicle 90.

Specifically, as illustrated in FIG. 6, the vehicle speed v_o of the preceding vehicle 90 is obtained by dividing the amount of movement s_o of the center of the rear part of the preceding vehicle 90 by the time t corresponding to the calculation cycle. Moreover, an angular acceleration rate α_o (rad/t) of the longitudinal direction of the preceding vehicle 90 is obtained by dividing the amount of change θ_o in the longitudinal direction of the preceding vehicle 90 by the time t. As a tread width w (m) of the left and right rear wheels 91, a value of a width of the rear part of the preceding vehicle 90 detected by the surrounding environment detection unit 61 is used as an alternative value. However, a method of obtaining the tread width w is not limited to the example mentioned above. For example, a value obtained by subtracting a tire width set at any value or a tire width estimated on the basis of the detection data by the surrounding environment detection unit 61 from the width of the rear part of the preceding vehicle 90 may be set as the tread width w.

Meanwhile, it is difficult to detect the longitudinal distance Lr between the axle 93 of the rear wheel 91 of the preceding vehicle 90 and the rear part of the preceding vehicle 90, with the surrounding environment sensor 31 that detects the preceding vehicle 90 from behind. Accordingly, in the present embodiment, the reference data regarding the distance Lr held in advance in the distance data database 55 is used. As described above, the distance data database 55 holds the maximum distance and the minimum distance assumed in common vehicles, for each kind of vehicles, as the first distance Lr1 and the second distance Lr2. In the present embodiment, the wheel slip angle estimation unit 69 extracts the first distance Lr1 and the second distance Lr2 corresponding to the kind of the preceding vehicle 90 acquired by the surrounding environment detection unit 61, from within the data regarding the first distance Lr1 and the second distance Lr2 held in association with the kind of the vehicle.

Thus, the wheel slip angle estimation unit 69 converts the slip angle β_o of the center of the rear part of the preceding vehicle 90 into the slip angle βr_o of the rear wheel 91, with the use of each of the first distance Lr1 and the second distance Lr2, by the following expression (1).

[Mathematical Expression 1]

$$\beta r\_o = \beta\_o + \frac{Lr * \alpha\_o}{v\_o} = \beta\_o + \frac{Lr \frac{\theta\_o}{t}}{\frac{s\_o}{t}} \quad (1)$$

However, the momentum of the preceding vehicle 90 satisfies the condition of the following expression (2).

[Mathematical Expression 2]

$$|\beta\_o|, \left|\frac{Lr\frac{\theta\_o}{t}}{\frac{s\_o}{t}}\right|, \left|\frac{w}{2\frac{s}{t}}\right| \ll 1 \quad (2)$$

That is, in the present embodiment, because it is difficult to detect the longitudinal distance Lr between the axle 93 of the rear wheel 91 of the preceding vehicle 90 and the rear part of the preceding vehicle 90, the slip angles βr_o1 and βr_o2 of the two rear wheels 91 are obtained, by calculation, with the use of the maximum distance (first distance Lr1) and the minimum distance (second distance Lr2) assumed in common vehicles. Thus, whichever of the slip angles βr_o is greater is adopted, in consideration of safety risk.

Returning to FIG. 3, after obtaining, by calculation, the slip angle βr_o of the rear wheel 91 of the preceding vehicle 90, the processor 51, or the risk avoidance controller 71, determines whether or not the slip angle βr_o of the rear wheel 91 of the preceding vehicle 90 estimated by the wheel slip angle estimation unit 69 exceeds a preset threshold βr_o_0 (step S21). Assuming that a friction coefficient of the tire is u and a wheel load is W, a cornering force K (N) is represented by the following expression (3). Accordingly, as illustrated in FIG. 7, the cornering force K is saturated as the slip angle βr of the wheel becomes greater.

$$K = 3\mu W / \tan \beta r \quad (3)$$

Accordingly, it is known that, as the slip angle βr_o of the rear wheel 91 becomes greater, the cornering force is saturated, resulting in a risky state with possibility that the vehicle may spin. Thus, the threshold $\beta r\_o\_0$ may be set at any value in a region where the cornering force K is not saturated from relation between the slip angle $\beta r\_o$ of the rear wheel 91 and the cornering force.

In a case where the slip angle $\beta r\_o$ of the rear wheel 91 does not exceed the threshold $\beta r\_o\_0$ (S21/No), there is no possibility of the spinning of the preceding vehicle 90. Accordingly, the processor 51 determines whether or not to stop the on-vehicle system (step S25). Unless the processor 51 stops the on-vehicle system (S25/No), the processor 51 causes the flow to return to step S13 and repeat the processes described above. Meanwhile, in a case where the slip angle $\beta r\_o$ of the rear wheel 91 exceeds the threshold $\beta r\_o\_0$ (S21/Yes), because there is possibility of the spinning of the preceding vehicle 90, the risk avoidance controller 71 sets the driving condition of the vehicle 1, to avoid the risk that the vehicle 1 collides with the preceding vehicle 90 even in a case where the preceding vehicle 90 spins (step S23). For example, the risk avoidance controller 71 sets a deceleration rate on the basis of the data regarding the relative speed of the vehicle 1 with respect to the preceding vehicle 90 and the distance from the vehicle 1 to the preceding vehicle 90, and decelerates the vehicle 1 to reduce the risk of collision. Instead of decelerating the vehicle 1, or in combination with decelerating the vehicle 1, the risk avoidance controller 71 may correct the locus of the vehicle 1 to reduce the risk of collision.

Next, the processor 51 determines whether or not to stop the on-vehicle system (step S25). Unless the processor 51 stops the on-vehicle system (S25/No), the processor 51 causes the flow to return to step S13 to repeat the processes described above. Meanwhile, in the case where the processor 51 stops the on-vehicle system (S25/Yes), the processor 51 ends the processing.

The processor 51 of the driver assistance apparatus 50 estimates the slip angle $\beta r\_o$ of the rear wheel of the preceding vehicle 90 by performing the series of the processes in this way, and predicts the spinning of the preceding vehicle 90 in advance. Moreover, in a case where the spinning of the preceding vehicle 90 is predicted, the processor 51 sets the driving condition to reduce the risk of collision between the vehicle 1 and the preceding vehicle 90, and outputs data regarding the driving condition to the vehicle control device 41. In this way, it is possible to reduce the risk of collision between the vehicle 1 and the preceding vehicle 90 in the case where the preceding vehicle 90 spins, and to avoid the collision, or to reduce the damage on the occasion of the collision.

1-4. Effects

As described above, the driver assistance apparatus 50 according to the present embodiment calculates the vehicle speed $v\_o$ of the preceding vehicle 90 present ahead of the vehicle 1, and the amount of movement $s\_o$ and the slip angle $\beta\_o$ of the center of the rear part of the preceding vehicle 90, on the basis of the detection data by the surrounding environment sensor 31. Moreover, the driver assistance apparatus 50 estimates the slip angle $\beta r\_o$ of the rear wheel 91 of the preceding vehicle 90, on the basis of at least the data regarding the vehicle speed $v\_o$ of the preceding vehicle 90, and the amount of movement $s\_o$ and the slip angle $\beta\_o$ of the center of the rear part of the preceding vehicle 90, and the data regarding the estimated distance Lr from the axle 93 of the rear wheel 91 of the preceding vehicle 90 to the rear part of the preceding vehicle 90. This makes it possible to predict the spinning of the preceding vehicle 90 in advance before the vehicle body starts to spin, on the basis of not the behavior of the vehicle body of the preceding vehicle 90 but the slip angle $\beta r\_o$ of the rear wheel 91 as a point of grounding. Hence, it is possible to control the vehicle 1 in advance to reduce the risk of collision between the vehicle 1 and the preceding vehicle 90 when the preceding vehicle 90 spins.

Moreover, the driver assistance apparatus 50 according to the present embodiment calculates the slip angles $\beta r\_o1$ and $\beta r\_o2$ of the rear wheels 91, with the use of the two different distances held in the distance data database 55, i.e., the first distance Lr1 and the second distance Lr2 respectively, as the estimated distance Lr from the axle 93 of the rear wheel 91 of the preceding vehicle 90 to the rear part of the preceding vehicle 90. The driver assistance apparatus 50 according to the present embodiment determines the possibility of the spinning of the preceding vehicle 90 with the use of whichever value is greater out of the slip angles $\beta r\_o1$ and $\beta r\_o2$ of the rear wheels 91. Hence, it is possible to enhance the accuracy of the prediction of the spinning of the preceding vehicle 90, even in the case where it is difficult to identify the distance from the axle 93 of the rear wheel 91 of the preceding vehicle 90 to the rear part of the preceding vehicle 90 with the surrounding environment sensor 31 of the vehicle 1.

Moreover, in the driver assistance apparatus 50 according to the present embodiment, the first distance Lr1 and the second distance Lr2 are held in the distance data database 55. Each of the first distance Lr1 and the second distance Lr2 is set in accordance with the kind of the vehicle. Accordingly, it is possible to enhance the accuracy of the estimation of the slip angle $\beta r\_o$ of the rear wheel 91 of the preceding vehicle 90 in accordance with the kind of the preceding vehicle 90, even in the case where it is difficult to identify the distance from the axle 93 of the rear wheel 91 of the preceding vehicle 90 to the rear part of the preceding vehicle 90 with the surrounding environment sensor 31 of the vehicle 1.

Moreover, in the case where the estimated slip angle $\beta r\_o$ of the rear wheel 91 of the preceding vehicle 90 exceeds the predetermined threshold $\beta r\_o\_0$, the driver assistance apparatus 50 according to the present embodiment carries out a control of decelerating the vehicle 1. Hence, in the case where the preceding vehicle 90 spins, it is possible to avoid the collision between the vehicle 1 and the preceding vehicle 90, or to reduce the damage at the time of the collision.

1-5. Modification Examples

Although the driver assistance apparatus 50 according to the present embodiment has been described above, various modifications of the driver assistance apparatus 50 according to the forgoing embodiment may be made. In the following, some modification examples of the driver assistance apparatus 50 are described.

For example, in the forgoing embodiment, the slip angle $\beta r\_o$ of the rear wheel of the preceding vehicle 90 traveling ahead of the vehicle 1 is estimated. However, instead of the preceding vehicle 90, or in conjunction with the preceding vehicle 90, the slip angle $\beta r\_o$ of the rear wheel of an on-coming vehicle present ahead of the vehicle 1 may be estimated. In this case, the processor 51 detects a front part (front part) of the on-coming vehicle, and estimates the slip angle $\beta r\_o$ of the rear wheel of the on-coming vehicle with the use of an estimated distance Lf from an axle of a rear wheel of the on-coming vehicle to the front part of the on-coming vehicle, instead of the estimated distance Lr from the axle 93 of the rear wheel 91 of the preceding vehicle 90 to the rear part of the preceding vehicle 90 used in the forgoing embodiment. This makes it possible to predict the spinning of the on-coming vehicle in advance. Hence, it is possible to control the vehicle 1 in advance to reduce the risk of collision between the vehicle 1 and the on-coming vehicle when the on-coming vehicle spins.

It is to be noted that, in the case where the slip angle βr_o of the rear wheel of the on-coming vehicle is estimated, the processor 51 determines the possibility of the collision between the vehicle 1 and the on-coming vehicle on the basis of data regarding the traveling states of the vehicle 1 and the on-coming vehicle when the on-coming vehicle spins, and data regarding the momentum of the vehicle 1 and the on-coming vehicle. Solely in a case with a determination that there is possibility of collision, the processor 51 may carry out the risk avoidance control.

Moreover, in the forgoing embodiment, the processor 51 estimates the slip angle βr_o of the rear wheel and predicts the spinning of the random vehicle in advance. However, a slip angular speed ωr_o may be estimated in place of the slip angle βr_o. In this case, it suffices that the processor 51 obtains, in each routine, the slip angle βr_o by integrating the estimated slip angular speed ωr_o, and applies the slip angle βr_o to the forgoing expressions (1) and (2). Even in the case where the slip angular speed ωr_o is estimated, it is possible to obtain similar effects to those of the forgoing embodiment.

2. Second Embodiment

Next, a driver assistance apparatus according to a second embodiment of the disclosure is described. The driver assistance apparatus according to the second embodiment is configured to: estimate the slip angle of the rear wheel of the random vehicle present ahead of the vehicle equipped with the driver assistance apparatus; record, on map data, a position where the random vehicle may spin; and carry out a control of avoiding the risk that the vehicle spins at the relevant position.

In the following, the driver assistance apparatus according to the second embodiment is described mainly with respect to differences from the driver assistance apparatus according to the first embodiment. It is to be noted that, in the present embodiment, the random vehicle is not limited to the preceding vehicle and the on-coming vehicle, but may be any random vehicle of which a front part or a rear part is detectable by the surrounding environment sensor 31 of the vehicle 1.

2-1. Configuration of Driver Assistance Apparatus

FIG. 8 is a block diagram illustrating a configuration example of a driver assistance apparatus 50A according to the second embodiment. The processor 51 of the driver assistance apparatus 50A according to the present embodiment includes a slip position recording unit 81 and a slip avoidance controller 83, instead of the risk avoidance controller 71 in the driver assistance apparatus 50 according to the first embodiment. Moreover, the driver assistance apparatus 50A according to the present embodiment includes a map data storage 57 that holds map data. The map data storage 57 may hold map data to be used in a navigation system, or may be provided exclusively for the driver assistance apparatus 50A.

The surrounding environment detection unit 61, the vehicle data acquisition unit 63, the vehicle momentum calculation unit 65, the random vehicle momentum calculation unit 67, and the wheel slip angle estimation unit 69 of the processor 51 have similar functions to those of the driver assistance apparatus 50 according to the first embodiment.

In a case where the slip angle of the rear wheel of the random vehicle estimated by the wheel slip angle estimation unit 69 exceeds a preset threshold, the slip position recording unit 81 carries out processing of recording, on the map data, a traveling point of the random vehicle when the slip angle of the rear wheel of the random vehicle exceeds the threshold, as a slip position. Moreover, the slip avoidance controller 83 carries out processing of placing limitation on at least one of a steering angular speed or an acceleration deceleration rate of the vehicle 1, on the occasion that the vehicle 1 passes through the slip position recorded on the map data while the vehicle 1 is traveling. The slip position recording unit 81 and the slip avoidance controller 83 may be a function realized by execution of a computer program by the processor 51, but a portion thereof may include an analog circuit.

2-2. Operation of Driver Assistance Apparatus

Next, operation examples of the driver assistance apparatus 50A according to the present embodiment are described in detail by dividing them into slip position determination recording processing and slip avoidance control processing.

2-2-1. Slip Position Determination Recording Processing

FIG. 9 is a flowchart illustrating an example of the slip position determination recording processing to be carried out by the processor 51 of the driver assistance apparatus 50A.

First, upon the start-up of the on-vehicle system including the driver assistance apparatus 50A (step S11), the processor 51 carries out the processes of each step of steps S11 to S21 in accordance with the procedure described in the first embodiment.

In step S21, in the case where the slip angle βr_o of the rear wheel 91 of the random vehicle does not exceed the threshold βr_o_0 (S21/No), there is no possibility that the random vehicle spins, and therefore, the processor 51 determines whether or not to stop the on-vehicle system (step S25). Unless the processor 51 stops the on-vehicle system (S25/No), the processor 51 causes the flow to return to step S13 and repeat the processes described above. Meanwhile, in the case where the slip angle βr_o of the rear wheel 91 exceeds the threshold βr_o_0 (S21/Yes), the slip position recording unit 81 records, on the map data, the traveling point of the random vehicle when the slip angle βr_o of the rear wheel 91 of the random vehicle exceeds the threshold βr_o_0, as the slip position (step S27).

Specifically, the slip position recording unit 81 calculates a coordinate position of the traveling point of the random vehicle on the basis of positional data regarding the vehicle 1 on the global coordinate system at the time when the slip angle βr_o of the rear wheel 91 of the random vehicle exceeds the threshold βr_o_0, and a relative position of the random vehicle with respect to the vehicle 1 at the relevant time. Thus, the slip position recording unit 81 records the coordinate position of the relevant traveling point on the map data.

Next, the processor 51 determines whether or not to stop the on-vehicle system (step S25). Unless the processor 51 stops the on-vehicle system (S25/No), the processor 51 causes the flow to return to step S13 and repeat the processes described above. Meanwhile, in the case where the processor 51 stops the on-vehicle system (S25/Yes), the processor 51 ends the processing.

2-2-2. Slip Avoidance Control Processing

FIG. 10 is a flowchart illustrating an example of the slip avoidance control processing to be carried out by the processor 51 of the driver assistance apparatus 50A.

First, upon the start-up of the on-vehicle system including the driver assistance apparatus 50A (step S41), the vehicle data acquisition unit 63 of the processor 51 acquires the data regarding the vehicle 1 (step S43). Specifically, the vehicle data acquisition unit 63 acquires at least the positional data regarding the vehicle 1 transmitted from the GNSS sensor 37 and obtains, by calculation, the direction of travel of the vehicle 1 on the basis of the change in the position of the vehicle 1.

Next, the slip avoidance controller 83 determines presence or absence of any slip positions recorded on the map data, ahead of the vehicle 1 in the direction of travel of the vehicle 1 (step S45). For example, the slip avoidance controller 83 determines the presence or the absence of any slip positions in a predetermined range ahead along a road on which the vehicle 1 is traveling. Alternatively, in a case where the vehicle 1 is in automated driving or in a case with setting of a travel route in the navigation system, the slip avoidance controller 83 determines the presence or the absence of any slip positions within a predetermined range along the travel route. The predetermined range may be, for example, a range of a distance of 50 m to 200 m from the vehicle 1, but is not limited to this range.

The slip avoidance controller 83 may determine the presence of the slip position, in a case where the slip position is recorded, either on the road being traveled, or in the predetermined range along the road set as the travel route. The slip avoidance controller 83 may determine the presence of the slip position, in a case where the slip position is recorded inside a lane to be scheduled to be traveled by the vehicle 1.

In a case with the absence of any slip positions ahead in the direction of travel of the vehicle 1 (S45/No), there is no possibility that the vehicle 1 spins, and therefore, the processor 51 determines whether or not to stop the on-vehicle system (step S49). Unless the processor 51 stops the on-vehicle system (S49/No), the processor 51 causes the flow to return to step S43 and repeat the processes described above. Meanwhile, in a case with the presence of the slip position ahead in the direction of travel of the vehicle 1 (S45/Yes), there is possibility that the vehicle 1 spins at the slip position, and therefore, the slip avoidance controller 83 places the limitation on one or both of the steering angular speed and the acceleration deceleration rate of the vehicle 1 (S47). That is, the slip avoidance controller 83 carries out processing of setting an upper limit on the steering angular speed or the acceleration deceleration rate of the vehicle 1, and suppressing a sudden change in the behavior of the vehicle 1. The upper limit on the steering angular speed or the acceleration deceleration rate of the vehicle 1 may be set to any value in advance. This makes it possible to prevent the spinning of the vehicle 1 when the vehicle 1 passes through the slip position.

The timing to place the limitation on at least one of the steering angular speed or the acceleration deceleration rate of the vehicle 1 may be, for example, when the distance to the slip position reaches a preset distance. Alternatively, the distance may be variable in accordance with the vehicle speed of the vehicle 1. Moreover, in a case where the recorded slip position is present in the middle of a curve, the timing to place the limitation on at least one of the steering angular speed and the acceleration deceleration rate of the vehicle 1 may be set with reference to an entrance to the curve.

2-3. Effects

As described above, the driver assistance apparatus 50A according to the present embodiment estimates the slip angle $\beta r\_o$ of the rear wheel of the random vehicle traveling around the vehicle 1, and records, on the map data, the traveling point of the random vehicle when the slip angle $\beta r\_o$ exceeds the predetermined threshold $\beta r\_o\_0$, as the slip position. Moreover, in the case with the presence of the slip position ahead while the vehicle 1 is traveling, the driver assistance apparatus 50A places the limitation in advance on at least one of the steering angular speed or the acceleration deceleration rate of the vehicle 1. Hence, when the vehicle 1 passes through the slip position, it is possible to suppress a sudden change in the behavior of the vehicle 1 and prevent the spinning of the vehicle 1.

It is to be noted that, in the driver assistance apparatus 50A according to the present embodiment as well, the processor 51 may estimate the slip angular speed $\omega r\_o$ in place of the slip angle $\beta r\_o$ of the rear wheel. Moreover, the functions of the slip position recording unit 81 and the slip avoidance controller 83 of the driver assistance apparatus 50A according to the present embodiment may be additionally provided in the driver assistance apparatus 50 according to the first embodiment.

Moreover, in recording the slip position on the map data, the slip position recording unit 81 of the driver assistance apparatus 50A according to the present embodiment may record the slip position in association with data regarding the season and data regarding the time when the slip angle $\beta r\_o$ of the rear wheel of the random vehicle exceeds the threshold $\beta r\_o\_0$. Thus, the slip avoidance controller 83 of the driver assistance apparatus 50A may compare the current season and the current time, with the data regarding the season and the data regarding the time associated with the slip position. In a case where the vehicle 1 travels through the slip position in the same season and in the same period of the day, the slip avoidance controller 83 of the driver assistance apparatus 50A may place the limitation on the steering angular speed and the acceleration deceleration rate of the vehicle 1. This makes it possible to prevent the limitation from being placed on the steering angular speed or the acceleration deceleration rate in a case with little possibility of the spinning of the vehicle 1.

Moreover, in the driver assistance apparatus 50A according to the present embodiment, the data regarding the slip position is recorded in the map data storage 57 provided in the vehicle 1. However, the data regarding the slip position may be recorded in map data held in a server configured to communicate with the driver assistance apparatus 50A through mobile communication means. This makes it possible to share the map data in which the slip position is recorded, with multiple vehicles, leading to an increase in the number of the slip positions collected. It is also possible to carry out the control of avoiding the spinning of the vehicle even in an area where each of the vehicles travels for the first time.

Although preferred embodiments of the disclosure have been described in the foregoing with reference to the accompanying drawings, the disclosure is by no means limited to such examples. It should be appreciated that various modifications and alterations may be made by persons skilled in the art without departing from the scope as defined by the appended claims. The disclosure is intended to include such modifications and alterations in so far as they fall within the scope of the appended claims.

For example, in the foregoing embodiments, all the functions of the driver assistance apparatus are mounted on the vehicle 1, but the disclosure is not limited to such an example. For example, some of the functions of the driver assistance apparatus may be provided in a server apparatus configured to communicate through mobile communication means, and the driver assistance apparatus may be configured to transmit and receive data to and from the server apparatus.

DESCRIPTION OF REFERENCE NUMERALS

1: Vehicle (the vehicle)
9: Driving force source
15: Electric steering device
20: Brake hydraulic control unit
31: Surrounding environment sensor
31LF, 31RF: Forward view capturing camera
31S: LiDAR
35: Vehicle state sensor
37: GNSS sensor
41: Vehicle control device
50, 50A: Driver assistance apparatus
51: Processor
53: Storage
55: Distance data database
57: Map data storage
61: Surrounding environment detection unit
63: Vehicle data acquisition unit
65: Vehicle momentum calculation unit
67: Random vehicle momentum calculation unit
69: Wheel slip angle estimation unit
71: Risk avoidance controller
81: Slip position recording unit
83: Slip avoidance controller
90: Preceding vehicle
91: Rear wheel
93: Axle
D_e: Longitudinal direction of vehicle
D_o: Longitudinal direction of vehicle
Dm_o: Movement-wise direction
Lr: Distance
Lr1: First distance
Lr2: Second distance
s_e: Amount of movement
s_o: Amount of movement
v_o: Vehicle speed
w: Tread width
β_o: Slip angle of vehicle
βr_o: Slip angle of rear wheel
ωr_o: Slip angular speed of rear wheel

The invention claimed is:

1. A driver assistance apparatus for a vehicle, comprising:
one or more processors; and
one or more memories communicably coupled to the one or more processors, wherein
the processors are configured to
calculate a vehicle speed of a random vehicle present ahead of the vehicle, and momentum of a front part or a rear part of the random vehicle, on a basis of detection data by a surrounding environment sensor configured to detect data regarding surrounding environment around the vehicle,
estimate a slip angle or a slip angular speed of a rear wheel of the random vehicle, on a basis of data regarding at least the vehicle speed of the random vehicle and the momentum of the front part or the rear part of the random vehicle, and data regarding an estimated distance from the rear wheel of the random vehicle to the front part or the rear part of the random vehicle, and
decelerate the vehicle, on a condition that the slip angle or the slip angular speed of the rear wheel of the random vehicle exceeds a predetermined threshold.

2. The driver assistance apparatus according to claim 1, wherein
as the estimated distance from the rear wheel of the random vehicle to the front part or the rear part of the random vehicle, two different distances including a first distance and a second distance are set in advance, and
the processors are configured to
estimate two values of the slip angle or two values of the slip angular speed, with use of each of the first distance and the second distance, and
set whichever value is greater out of the two values of the slip angle or the two values of the slip angular speed, to the slip angle or the slip angular speed of the rear wheel.

3. The driver assistance apparatus according to claim 2, wherein
the first distance and the second distance are set in advance in accordance with a kind of the random vehicle, and
the processors are configured to
use the first distance and the second distance that accord with the kind of the random vehicle estimated on the basis of the detection data by the surrounding environment sensor.

4. The driver assistance apparatus according to claim 1, wherein
on a condition that the slip angle or the slip angular speed of the rear wheel of the random vehicle exceeds a predetermined threshold,
the processors are configured to
record a traveling point of the random vehicle in a case where the slip angle or the slip angular speed of the rear wheel exceeds the predetermined threshold, and afterwards, place limitation on one or both of a steering angular speed and an acceleration deceleration rate of the vehicle on an occasion that the vehicle passes through the traveling point.

5. A driver assistance apparatus for a vehicle, comprising:
a random vehicle momentum calculation unit configured to calculate a vehicle speed of a random vehicle present ahead of the vehicle, and momentum of a front part or a rear part of the random vehicle, on a basis of detection data by a surrounding environment sensor configured to detect data regarding surrounding environment around the vehicle;
a wheel slip angle estimation unit configured to estimate a slip angle or a slip angular speed of a rear wheel of the random vehicle, on a basis of data regarding at least the vehicle speed of the random vehicle and the momentum of the front part or the rear part of the random vehicle, and data regarding an estimated distance from the rear wheel of the random vehicle to the front part or the rear part of the random vehicle; and a risk avoidance controller decelerate the vehicle, on a condition that the slip angle or the slip angular speed of the rear wheel of the random vehicle exceeds a predetermined threshold.

6. A non-transitory recording medium containing a computer program applicable to a driver assistance apparatus for a vehicle, the computer program causing one or more processors to carry out processing comprising:

calculating a vehicle speed of a random vehicle present ahead of the vehicle, and momentum of a front part or a rear part of the random vehicle, on a basis of detection data by a surrounding environment sensor configured to detect data regarding surrounding environment around the vehicle;

estimating a slip angle or a slip angular speed of a rear wheel of the random vehicle, on a basis of data regarding at least the vehicle speed of the random vehicle and the momentum of the front part or the rear part of the random vehicle, and data regarding an estimated distance from the rear wheel of the random vehicle to the front part or the rear part of the random vehicle; and decelerating the vehicle, on a condition that the slip angle or the slip angular speed of the rear wheel of the random vehicle exceeds a predetermined threshold.

* * * * *